(12) United States Patent
Hood

(10) Patent No.: US 8,842,990 B2
(45) Date of Patent: Sep. 23, 2014

(54) METHOD AND APPARATUS FOR DETECTING ROGUE OPTICAL NETWORK UNIT IN PASSIVE OPTICAL NETWORK

(75) Inventor: David Hood, Palo Alto, CA (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 708 days.

(21) Appl. No.: 12/981,365

(22) Filed: Dec. 29, 2010

(65) Prior Publication Data

US 2012/0039602 A1 Feb. 16, 2012

Related U.S. Application Data

(60) Provisional application No. 61/373,330, filed on Aug. 13, 2010.

(51) Int. Cl.
*H04J 14/00* (2006.01)
*H04Q 11/00* (2006.01)

(52) U.S. Cl.
CPC ... *H04Q 11/0067* (2013.01); *H04Q 2011/0083* (2013.01); *H04Q 2011/0079* (2013.01)
USPC .................... 398/71; 398/72; 398/67; 398/63

(58) Field of Classification Search
CPC .................. H04Q 11/0067; H04Q 2011/0079; H04Q 2011/0083; H04Q 2011/0084; H04B 10/272; H04B 10/2755; H04B 10/278; H04J 14/0245; H04J 14/0246; H04J 14/0249; H04J 14/025; H04J 14/0252
USPC ............ 398/70, 71, 72, 67, 66, 63, 58, 25, 38
See application file for complete search history.

(56) References Cited

U.S. PATENT DOCUMENTS

| | | | | |
|---|---|---|---|---|
| 7,646,990 B2 * | 1/2010 | Weber et al. | ................... | 398/197 |
| 7,729,612 B2 * | 6/2010 | Jiang et al. | ....................... | 398/10 |
| 7,778,543 B2 * | 8/2010 | Ferguson et al. | ............... | 398/15 |
| 7,818,648 B2 * | 10/2010 | Haran | ........................... | 714/752 |
| 7,840,135 B2 * | 11/2010 | Zhao et al. | ....................... | 398/33 |

(Continued)

OTHER PUBLICATIONS

"Point-To-Multipoint Deep Fiber Access," GPON with Ericsson EDA 1500 Fiber Solutions, 2008, 4 pages, LZT 108 9806, Ericsson AB.

(Continued)

*Primary Examiner* — M. R. Sedighian
(74) *Attorney, Agent, or Firm* — Blakely Sokoloff Taylor & Zafman LLP

(57) ABSTRACT

A method performed in an optical line terminal (OLT) in a passive optical network (PON) for detecting a rogue optical network unit (ONU) operating among a plurality of ONUs in the PON. The OLT receives a plurality of bursts of light from a plurality of ONUs, each burst being separated from other bursts by an inter-burst gap containing a minimum dark interval during which the OLT expects to receive no optical power. The OLT measures the received optical power during one or more of the minimum dark intervals of the inter-burst gaps and determines whether the inter-burst gaps were anomalous. In response to determining that an inter-burst gap was anomalous, the OLT increments an anomaly count that indicates a rogue ONU has been detected when the anomaly count exceeds an anomaly count threshold. When the anomaly count is exceeded, the OLT declares an alarm associated with the presence of a rogue ONU, and may also initiate rogue isolation diagnostics.

13 Claims, 4 Drawing Sheets

(56) References Cited

U.S. PATENT DOCUMENTS

| | | | |
|---|---|---|---|
| 8,111,987 B2 * | 2/2012 | Dalton et al. | 398/23 |
| 8,582,969 B1 * | 11/2013 | Sandstrom et al. | 398/66 |
| 2009/0123154 A1 | 5/2009 | Dalton et al. | |
| 2010/0183295 A1 | 7/2010 | Dalton et al. | |

OTHER PUBLICATIONS

Elmar Trojer et al., "Current and Next-Generation PONS: A technical overview of present and future PON technology," 2008, pp. 64-69, Ericsson Review No. 2.

ITU-T, G.984.1 (Mar. 2008) Gigabit-capable passive optical networks (GPON): General characteristics, 43 pages.

ITU-T, G.984.1 (Oct. 2009) Gigabit-capable passive optical networks (GPON): General characteristics—Amendment 1, 8 pages.

ITU-T, G.984.2 (Mar. 2003) Gigabit-capable Passive Optical Networks (GPON): Physical Media Dependent (PMD) layer specification, 38 pages.

ITU-T, G.984.2 (Feb. 2006) Gigabit-capable Passive Optical Networks (G-PON): Physical Media Dependent (PMD) layer specification—Amendment 1: New Appendix 111—Industry best practice for 2.488 Gbits/s downstream, 1.244 Gbit/s upstream G-PON, 12 pages.

ITU-T, G.984.2 (Mar. 2008) Gigabit-capable Passive Optical Networks (G-PON): Physical Media Dependent (PMD) layer specification—Amendment 2, 16 pages.

ITU-T, G.984.3 (Mar. 2008) "Gigabit-capable Passive Optical Networks (G-PON): Transmission convergence layer specification," 146 pages.

ITU-T, G.984.4 (Feb. 2008) "Gigabit-capable Passive Optical Networks (G-PON): ONT Management and control interface specification," 430 pages.

ITU-T, G.987.2 (Jan. 2010) "10-Gigabit-capable Passive Optical Networks (XG-PON): Physical media dependent (PMD) layer specification," 30 pages.

ITU Covering Note, "Erratum 1 (Apr. 2010) to Recommendation ITU-T G.984.3 (2008), *Gigabit-capable Passive Optical Networks (G-PON): Transmission convergence layer specification*,"Geneva, Apr. 28, 2010, 1 page.

ITU—Telecommunication Standardization Sector, Study Group 15—Contribution 866, "*Rogue ONU draft supplement*," May 2010, 6 pages.

Study Group 15, "*Rogue ONU draft supplement*," 3 Sep. 2010, 6 pages.

*ONU design principles* (a.k.a ONU's for dummies), Apr. 28, 2010, 4 pages.

ITU-T, G.987.3 (Oct. 2010) "10-Gigabit-capable Passive Optical Networks (XG-PON): Transmission convergence (TC) layer specification," 134 pages.

* cited by examiner

METHOD AND APPARATUS FOR DETECTING ROGUE OPTICAL NETWORK UNIT IN PASSIVE OPTICAL NETWORK

CROSS-REFERENCE TO RELATED APPLICATIONS

This application claims the benefit of U.S. Provisional Application No. 61/373,330, filed on Aug. 13, 2010, which is hereby incorporated by reference.

FIELD OF THE INVENTION

Embodiments of the invention relate generally to the field of telecommunications and more particularly to passive optical networks.

BACKGROUND

A passive optical network (PON) is a point-to-multipoint optical tree, with upstream capacity shared according to allocations of time by an optical line terminal (OLT) that acts as the node at the root of the optical tree. During each optical network unit's (ONU) allocated time, also referred to as a burst period, the ONU transmits a burst of modulated light that contains whatever information that ONU wishes to send upstream. The modulation format may convey information by way of phase or frequency modulation of one or more fixed power optical carriers or by way of a multiplicity of optical power levels. In all such modulation arrangements, the ONU is allowed to transmit optical power in excess of a designated minimum threshold only during its allocated burst period. By way of example, and not as a limitation, this description assumes a modulation arrangement comprising two optical power levels, designated a logical zero (low optical power) and a logical one (high optical power). Between bursts, the ONU may be required to turn off its optical transmitting device, such that it transmits zero optical power. Standards allow for turn-on and turn-off time at the beginning and end of a burst, respectively, during which an ONU may emit non-zero optical power, but not to exceed the specified minimum threshold. Before the turn-on time begins, and after the turn-off time ends, the ONU is required to transmit effectively no optical power.

The OLT controls the size and sequence of bursts from the plurality of ONUs through a so-called bandwidth map, which it broadcasts to all ONUs from time to time. When constructing its bandwidth map, the OLT reserves an interval, known as an inter-burst gap, a guard time, or a guard interval, between adjacent burst periods, such that the bursts will not overlap under normal circumstances. It is therefore expected that each pair of bursts be separated by a dark interval, during which no ONU should be transmitting optical power, at least a level of power below the logical zero threshold. The minimum or guaranteed dark interval is equal to the inter-burst gap specified by the bandwidth map, reduced by a tolerance for turn-on and turn-off time and by allowances for timing uncertainties in the ONUs' responses. The guard time and tolerances are bounded by standards. For example, the International Telecommunications Union recommends a minimum guard period of 64 bit times in "G.987.2, 10-Gigabit-capable Passive Optical Networks (XG-PON): Physical Media Dependent (PMD) Layer Specification" (January 2010). In this exemplary implementation, the accumulated tolerances may reduce the guaranteed dark interval to as few as 16 bit times.

While PON technology offers substantial economic benefit, it suffers from the risk that a defective ONU, a node at one of the leaves of the tree, can destroy some or all traffic on the PON by transmitting light continuously or at unauthorized times. Such an ONU is commonly known as a rogue ONU. The multipoint-to-point nature of the upstream PON makes it difficult to identify and isolate a rogue ONU.

Existing solutions include means by which an ONU can monitor its own behavior. For example, a watchdog timer can shut down an ONU if its transmitter remains on continuously. There are also existing messages from the OLT to direct the ONU to shut down, which may be effective if the ONU is able to receive and respond to such messages.

Algorithmic techniques have been proposed to identify and isolate a rogue ONU. Existing algorithms involve, for example, disabling all ONUs and then re-enabling one at a time to search for the rogue ONU; alternatively, disabling one ONU at a time to search for the rogue, or rearranging the burst allocation sequence. Because these techniques disrupt service, they are generally not invoked automatically, which means that a rogue ONU may itself disrupt service for an extended period of time before diagnostics are initiated by maintenance personnel.

Existing art provides no way to detect the presence of a rogue ONU other than deduction based on generalized PON failure or erratic PON performance, the latter of which may be recognized only by customer complaints. It would facilitate the diagnosis process to have an indication that a rogue ONU is present.

SUMMARY OF THE INVENTION

Embodiments of the invention include a method performed in an optical line terminal in a passive optical network for detecting a rogue optical network unit among a plurality of optical network units in the passive optical network. The optical line terminal receives a plurality of bursts of light from the plurality of optical network units. Each of the bursts of light are separated from other bursts of light by an inter-burst gap containing a minimum dark interval during which the optical line terminal expects to receive no optical power. The optical line terminal receives optical power during one or more of the minimum dark intervals and determines whether one or more inter-burst gaps was anomalous based on, at least, the optical power received during one or more of the minimum dark intervals. In response to determining that one or more of the inter-burst gaps was anomalous, the optical line terminal declares an alarm associated with the presence of the rogue optical network unit.

Embodiments of the invention include an optical line terminal to operate in a passive optical network. The optical line terminal includes an optical transceiver to receive bursts of light. The optical line terminal is configured to determine whether an inter-burst gap between two bursts of light was anomalous on the basis of received optical power during a minimum dark interval in the inter-burst gap. In response to determining that the inter-burst gap was anomalous, the optical line terminal is configured to declare an alarm associated with the presence of a rogue optical network unit.

Embodiments of the invention include a method performed in an optical line terminal in a passive optical network for detecting a rogue optical network unit among a plurality of optical network units in the passive optical network. The optical line terminal receives a plurality of bursts of light from the plurality of optical network units. Each of the bursts of light are separated from other bursts of light by an inter-burst gap containing a minimum dark interval during which the optical line terminal expects to receive no optical power. The optical line terminal receives optical power during one or more of the minimum dark intervals and determines whether one or more inter-burst gaps was anomalous based on, at least, the optical power received during one or more of the minimum dark intervals. In response to determining that one or more of the inter-burst gaps was anomalous, the optical line terminal automatically initiates diagnostics to identify the rogue optical network unit amongst the plurality of optical network units.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

The invention may best be understood by referring to the following description and accompanying drawings that are used to illustrate embodiments of the invention. In the drawings.

DETAILED DESCRIPTION

The following description describes methods and apparatus for detecting a rogue ONU in a PON. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but not every embodiment necessarily includes the particular feature, structure, or characteristic. Moreover, such phrases do not necessarily refer to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

To ease understanding, dashed lines are used in the figures to signify the optional nature of certain items (e.g., features not supported by a given implementation of the invention or features supported by a given implementation, but used in some situations and not in others).

Figure 1:
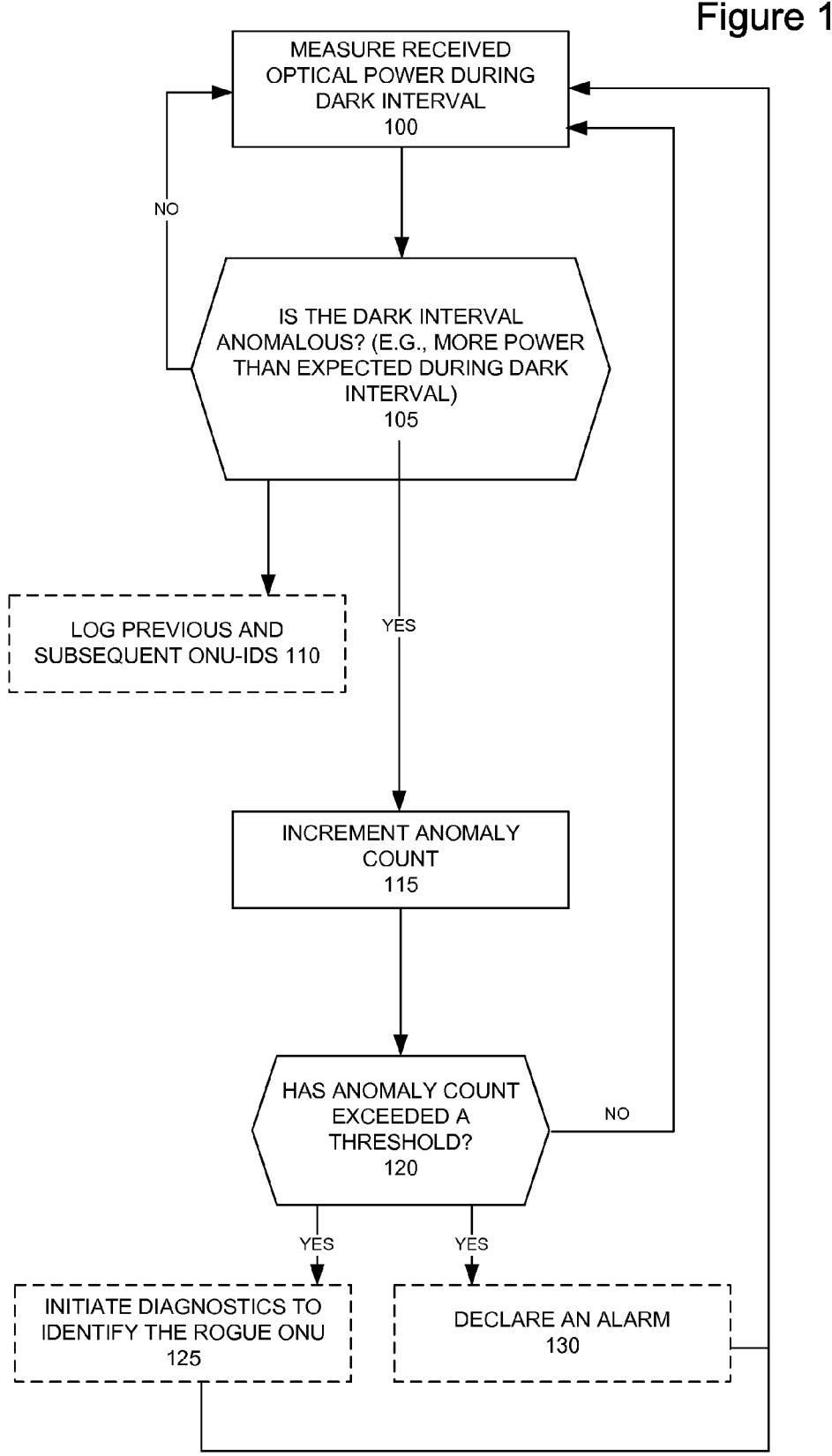
FIG. 1 is a flow chart illustrating a method performed in an OLT for detecting a rogue ONU operating in a PON.

FIG. 1 is a flow chart illustrating a method performed in an OLT for detecting a rogue ONU operating in a PON. The OLT begins by measuring the optical power received during the minimum dark interval of an inter-burst gap, block 100. The OLT then determines whether the inter-burst gap is anomalous, block 105.

As described, an OLT controls the allocation of burst periods to a plurality of ONUs on the PON. Thus, the OLT knows how many burst periods and how many inter-burst gaps, which is the time allocated between two burst periods, it expects during a given interval. Furthermore, the OLT knows how much guaranteed dark time should occur during a dark interval between two bursts, and how many dark intervals to expect. The expected number of bursts and dark intervals during a given period differs at most by 1, depending on whether, during a specified multi-burst observation period, dark intervals are bracketed between bursts of light, bursts are bracketed by dark intervals, or the specified period begins with one and ends with the other.

Therefore, in one embodiment, a PON anomaly is apparent because the OLT can make an intelligent comparison between the number of expected bursts during the multi-burst observation period, the number of received bursts, and the number of observed dark guard intervals. The OLT may then base its decision that an anomaly is present on whether these values are equal or approximately equal over the course of a time interval. In another embodiment, it may be equally suitable to count the number of inter-burst gaps in which non-zero optical power is observed. In this case, any such observation is anomalous because it was received during an inter-burst gap.

If the OLT determines that an inter-burst gap is not anomalous, then the OLT continues back to block 100 when another inter-burst gap is expected. If the OLT determines that the inter-burst gap is anomalous, then the OLT performs additional processing.

In one embodiment, the OLT logs an identifier corresponding with the ONU that sent the previous burst of light and an identifier corresponding with the ONU that sent the subsequent burst of light, block 110. The previous and subsequent ONU identifiers may help administrators troubleshoot the PON at a later point, in the event that the rogue ONU's failure mode is to transmit a wider burst than authorized, or at the incorrect time.

The OLT continues by incrementing a count of the number of anomalous intervals the OLT has observed, block 115. The OLT then determines whether the anomaly count has exceeded a predefined anomaly count threshold, block 120. In the case that the threshold has not been exceeded, the OLT continues back to block 100 when another inter-burst gap is expected. In the case that the threshold has been exceeded, the OLT continues to either to block 125 or block 130 depending on the embodiment. It will be appreciated that the threshold value may be set to zero, such that any anomaly triggers a response 125 or 130. In block 125, the OLT initiates diagnostics to identify the rogue ONU amongst a plurality of ONUs. Since a rogue ONU is by definition failing to abide by technical specifications for the PON, the OLT may initially have no knowledge of which of the plurality of ONUs is the rogue ONU. Thus, diagnostics which accurately identify the rogue ONU as one specific ONU or one of a subset of ONUs will allow administrators to address and correct technical problems with the rogue ONU. In block 130, the OLT declares an alarm and then continues back to block 100 when another inter-burst gap is expected. In other embodiments, the OLT automatically initiates diagnostics to identify the rogue ONU, block 125, and also declares an alarm associated with the rogue ONU, block 130.

In one embodiment, at the end of the multi-burst observation period, the anomaly count is cleared (not shown in FIG. 1), and the next observation period begins. In another embodiment, the anomaly count is periodically decremented (not shown in FIG. 1), and there may be no explicit observation period. These details prevent random events from eventually filling the anomaly counter.

Figure 2:
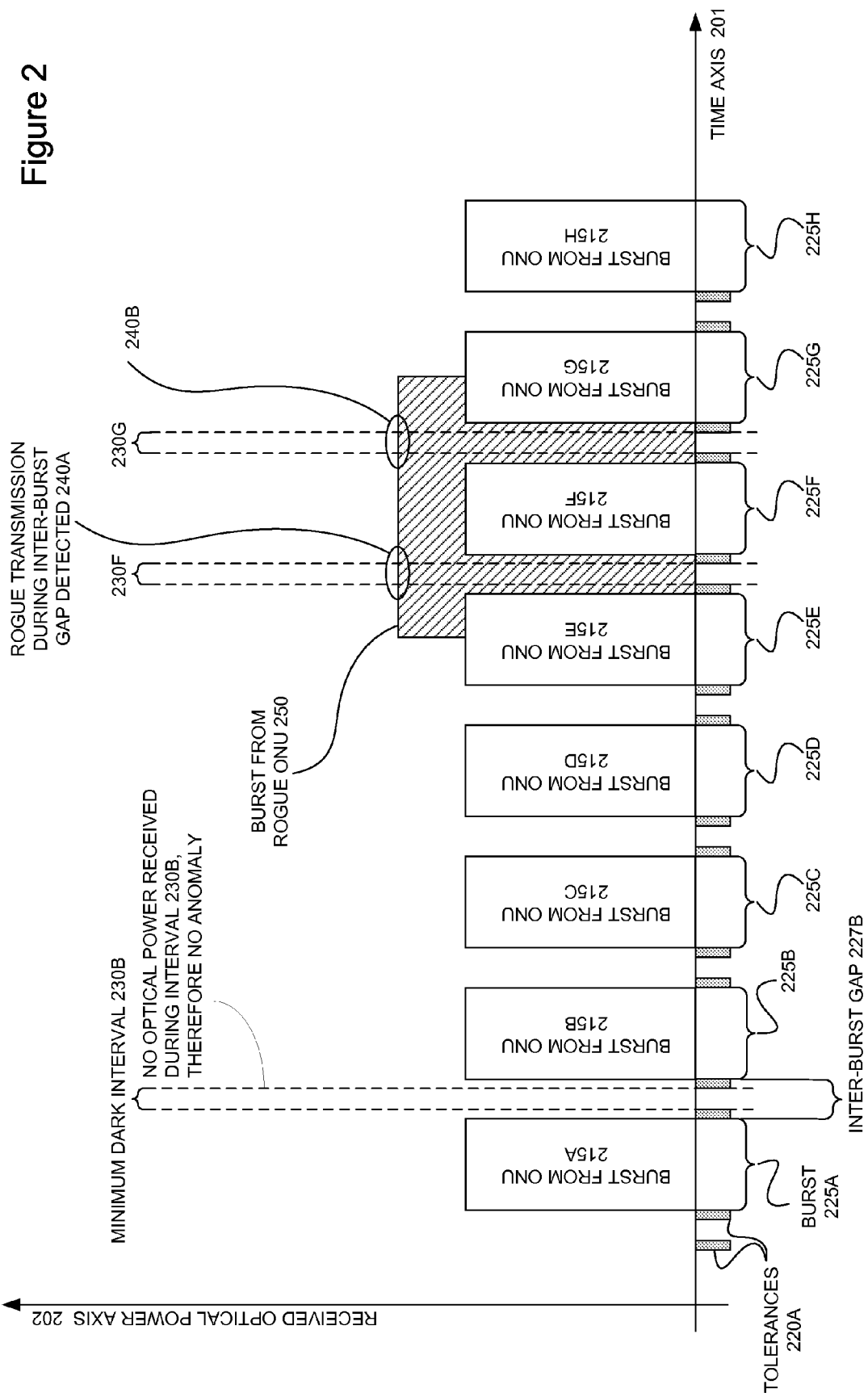
FIG. 2 is a chart illustrating received optical power at an OLT during a period of time that includes a burst of light from a rogue ONU with rogue detection based on measurement of received optical power during the minimum expected dark interval.

FIG. 2 is a chart illustrating a received optical power at an OLT during a period of time that includes a burst of light from a rogue ONU. In FIG. 2, duplicative labeling is avoided to prevent confusion in the figure. The horizontal axis 201 indicates the passage of time. The vertical axis 202 indicates the received optical power at the OLT. During the time period shown in FIG. 2, the OLT has allocated eight burst periods 225A-H, which for convenience are shown as being of equal size. Each of the eight burst periods 225A-H is preceded by an inter-burst gap 227A-H (only inter-burst gap 227B is labeled in FIG. 2). Each inter-burst gap comprises a minimum dark interval 230A-H (only 230B, 230F, and 230G are labeled in FIG. 2) surrounded by two tolerance times 220A-H (only 220A is labeled in FIG. 2). During the burst periods 225A-H, the OLT is prepared to receive optical power from one of a plurality of ONUs. In the modulation scheme used for illustration, the optical power varies between a lower intensity that represents a logical zero and a higher intensity that represents a logical one. In FIG. 2, the OLT receives bursts from ONUs 215A-H. Each burst 215A-H represents a series of logical zeros and logical ones received at the OLT. During the inter-burst gaps 227A-H, the OLT expects a previously transmitting ONU to stop transmitting and expects to receive less optical power than a logical zero, and no optical power during each of the minimum dark intervals 230A-H. During properly transmitted minimum dark intervals such as 230B, the OLT measures effectively zero received optical power, and determines that the corresponding inter-burst gap 227B is not anomalous.

In FIG. 2, the OLT begins receiving a burst from a rogue ONU 250 during burst period 225E. The rogue burst 250 is shown in a hatched box ending during burst period 225G. The rogue burst 250 will interfere with the properly transmitted bursts 215E-G effectively disrupting operation of the PON. Due to the nature of a PON being that the OLT receives communication from a plurality of ONUs on a single fiber, the OLT may be unaware or unsure whether a rogue burst is being transmitted during the burst period 225E as the OLT is expecting to receive optical power from an assigned ONU other than the rogue ONU. However, since the OLT expects to receive little to no optical power during the minimum dark intervals 230E-G, the OLT is able to detect the rogue transmission based on non-zero optical power measured during the expected minimum dark intervals 230E-G of inter-burst gaps 227F-G. The OLT's detection of the rogue transmission is shown at 240A-B where the OLT is receiving more optical power than what represents a logical zero, or receives a level at least equal to a logical zero, during the minimum dark intervals 230E-G. The OLT therefore determines that inter-burst gaps 227F and 227G are anomalous.

Figure 3:
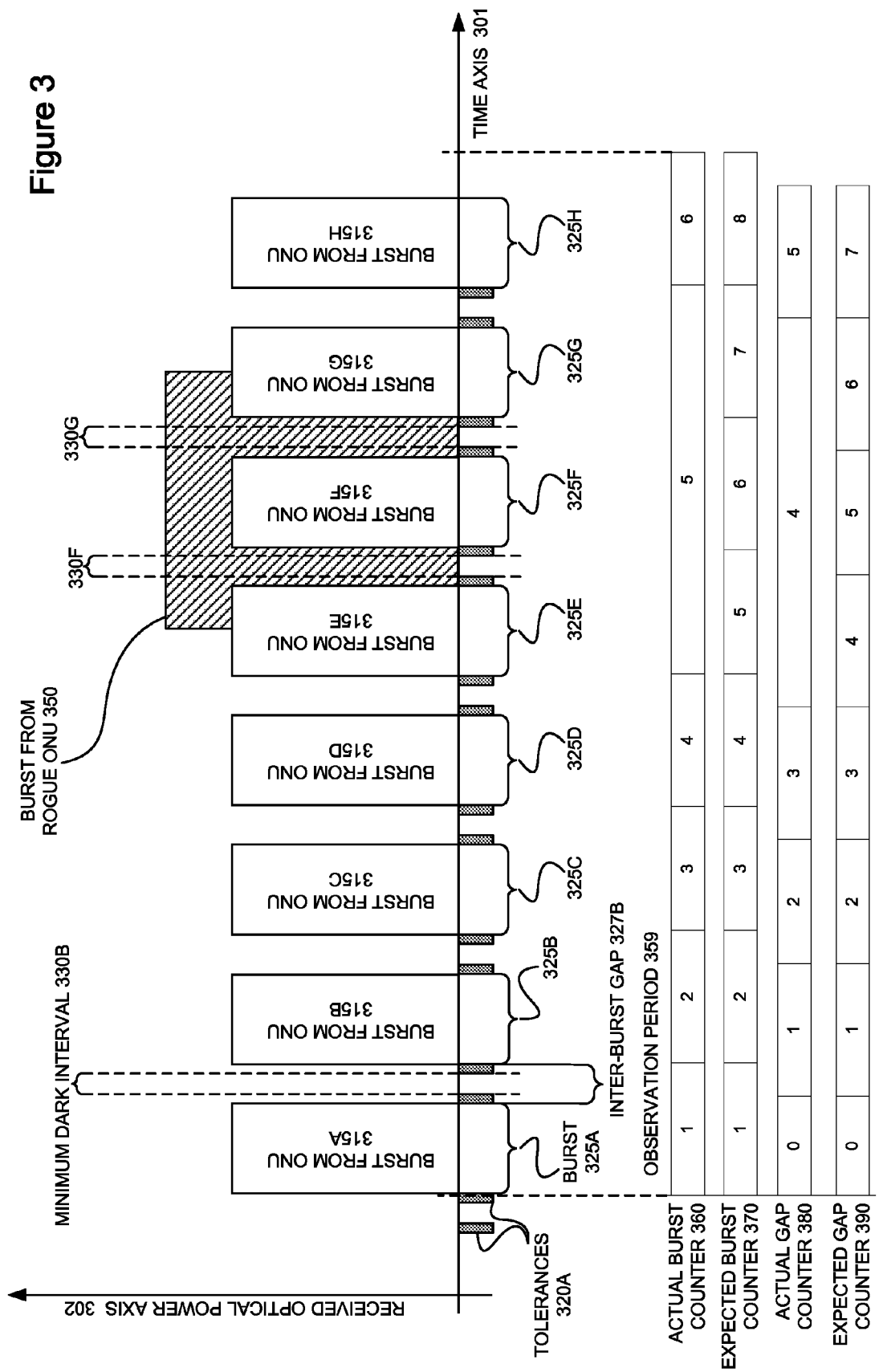
FIG. 3 is a chart illustrating received optical power at an OLT during a period of time that includes a burst of light from a rogue ONU with rogue detection based on counts of bursts and dark intervals.

FIG. 3 is a chart similar to FIG. 2, also illustrating a received optical power at an OLT during a period of time that includes a burst of light from a rogue ONU. Below the chart showing received optical power over time, FIG. 3 shows counters of actual and expected bursts and inter-burst gaps. The counters are shown over a period of time, an observation period 359 starting at the beginning of burst 325A. It will be appreciated that the observation period can start at any time, and can be of any size, including as little as a single burst or a single inter-burst gap. In FIG. 3, the OLT receives bursts from ONUs 315A-H. Each burst 315A-H represents a series of logical zeros and logical ones received at the OLT. During the inter-burst gaps 327A-H, the OLT expects a previously transmitting ONU to stop transmitting and expects to receive less optical power than a logical zero, and no optical power during each of the minimum dark intervals 330A-H. FIG. 3 shows counters that track the number of expected bursts 370, the number of expected inter-burst gaps 390, and the number of actual bursts 360 and gaps 380 observed.

In FIG. 3, the OLT begins receiving a burst from a rogue ONU 350 during burst period 325E. The rogue burst 350 is shown in a hatched box ending during burst period 325G. Power received from the rogue ONU prevents the OLT from incrementing either the actual burst counter 360 or the actual gap counter 380, which therefore diverge from their expected values during the interval of rogue transmission. The OLT is therefore able to detect the rogue transmission by comparing actual and expected counter values. It will be appreciated that, if the observation interval spanned only bursts 325E-F, for example, that the single expected inter-burst gap 327F would produce an anomaly indication as input to the anomaly counter 115 of FIG. 1.

Figure 4:
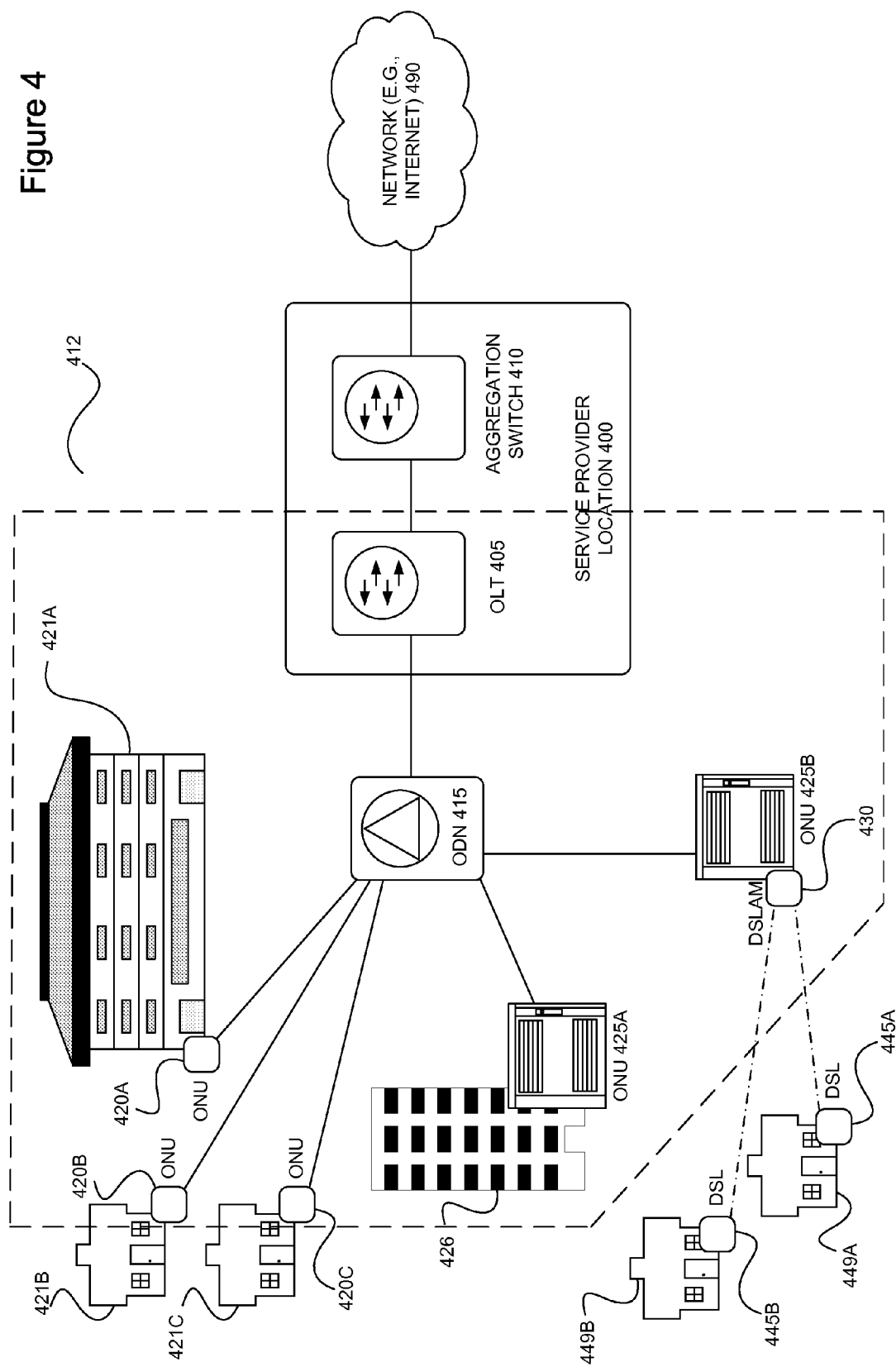
FIG. 4 is a block diagram illustrating a PON including an OLT and a plurality of ONUs according to embodiments of the invention.

FIG. 4 is a block diagram illustrating a PON including an OLT and a plurality of ONUs according to embodiments of the invention. In FIG. 4, a service provider location 400 comprises an OLT 405 coupled with an aggregation switch 410. The aggregation switch couples a PON 412 served by the OLT 405 with another network 490. In one embodiment, the other network 490 is the internet, while in other embodiments the other network 490 comprises: a telecommunications operator backbone transport network, another wide area network, or a metro ethernet network. The OLT 405 is coupled to an optical distribution network (ODN) 415. The ODN 415 comprises a series of optical fibers and splitters between the OLT 405 and the plurality of ONUs 420A-C and 425A-B in the PON 412. The OLT 405 is coupled to the ODN 415 with one or more optical fibers with, in the upstream direction, each optical fiber ultimately carrying optical power from one or more ONUs. The OLT 405 detects light on an optical fiber through an optical transceiver that is further capable of transmitting light down the fiber toward the ONUs. FIG. 4 shows a plurality of ONUs 420A-C, and 425A-B coupled to the ODN 415. Each of the one or more ONUs, also referred to as optical network terminals (ONTs), converts optical signals into electrical signals for delivery via another medium such as copper or wireless. A typical ONU allows a fiber-optic connection to provide multiple services to a subscriber, such as plain old telephone service (POTS), internet data, and video.

In FIG. 4, the PON 412 comprises fiber-optic connections to two homes 421B and 421C. Each of the corresponding ONUs 420B-C serves subscribers at the homes. These connections are referred to as Fiber-To-The-Home (FTTH). FTTH is optimized for single-family homes.

The PON 412 further comprises Fiber-To-The-Premises (FTTP) and Fiber-To-The-Building (FTTB) connections. FTTP connections and FTTB connections refer to fiber-optic delivery that terminates prior to reaching the subscribers' living area or work area. For example, 421A is a multi-family dwelling unit such as an apartment complex with an FTTP connection terminated at ONU 420A. The apartment complex then provides service to one or more subscribers through any networking technology such as conventional twisted pair, coaxial cable, wireless, power-line communication, or even an on-site optical network. Similarly, an office building such as 426 has an FTTB connection that terminates at ONU 425A. ONU 425A then converts the fiber-optic communication into other network technologies for distribution to subscribers within the office building 426.

PON 412 further comprises a Fiber-To-The-Curb (FTTC) connection terminated at the ONU 425B. With FTTC connections, the ODN terminates near the location of several customers and some other form of broadband is used to couple each customer with the ONU. In one embodiment, digital subscriber line (DSL) broadband is used to couple subscribers to the ONU. In FIG. 4, ONU 425B is coupled to a DSL access multiplexer (DSLAM) 430. The DSLAM 430 provides a data connection with DSL modems 435A-B, which allow subscribers in homes 436A-B to access data services provided by ONU 425B. Other embodiments may use other broadband technologies to couple ONU 425B with subscribers (e.g., category 5 or 6 twisted pair, coaxial cable, wireless, power-line communication, or even a secondary optical network). ONUs 425A-B are shown as larger then ONU's 420A-C to indicate that some ONUs may be designed to serve more subscribers as is typical with ONUs providing FTTB and FTTC connections as compared with ONUs providing FTTP and FTTH connections.

ALTERNATIVE EMBODIMENTS

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method performed in an optical line terminal (OLT) in a passive optical network (PON) for detecting a rogue optical network unit (ONU) operating among a plurality of ONUs in the PON, the method comprising the steps of:
   receiving a plurality of bursts of light from the plurality of ONUs, each of the plurality of bursts of light separated from the other bursts of light by an inter-burst gap containing a minimum dark interval during which the OLT expects to receive no optical power;
   receiving optical power during one or more of the minimum dark intervals;
   determining whether one or more of the inter-burst gaps was anomalous based on, at least, the optical power received during one or more of the minimum dark intervals; and
   in response to determining that one or more of the inter-burst gaps was anomalous, declaring an alarm associated with the presence of the rogue ONU.

2. The method of claim 1, further comprising the steps of:
   counting the number of observed dark intervals during an observation period including the one or more expected dark intervals; and
   determining further whether one or more inter-burst gaps was anomalous on the basis of the number of dark intervals observed during the observation period, compared with the number of expected dark intervals.

3. The method of claim 1, further comprising the steps of:
   measuring the optical power that was received during one or more minimum dark intervals;
   determining that the received optical power exceeded a non-zero optical power threshold during one or more of the minimum dark intervals; and
   in response to determining that the received optical power exceeded a non-zero optical power threshold during one or more of the minimum dark intervals, determining that those inter-burst gaps were anomalous.

4. The method of claim 1, further comprising the steps of:
   in response to determining that one or more of the inter-burst gaps was anomalous, incrementing an anomaly count that indicates a rogue ONU has been detected when an anomaly count threshold is exceeded; and
   wherein the declaring of the alarm associated with the presence of the rogue ONU is in response to the anomaly count exceeding the anomaly count threshold.

5. The method of claim 1, further comprising the steps of:
   in response to receiving an anomalous inter-burst gap, determining identifiers associated with the ONU that transmitted the immediately preceding burst of light and the ONU that transmitted the immediately subsequent burst of light; and
   in response to receiving an anomalous inter-burst gap, logging the identifier associated with an immediately previous burst of light and logging the identifier associated with an immediately subsequent burst of light.

6. An optical line terminal (OLT) to operate in a passive optical network (PON), the OLT including an optical transceiver to receive bursts of light and the OLT configured to:
   determine whether an inter-burst gap between two bursts of light was anomalous on the basis of received optical power during a minimum dark interval in the inter-burst gap; and
   in response to determining that the inter-burst gap was anomalous, declare an alarm associated with the presence of a rogue ONU.

7. The OLT of claim 6, further configured to:
   in response to determining that the inter-burst gap was anomalous, increment an anomaly count that indicates a rogue ONU has been detected when an anomaly count threshold is exceeded; and
   wherein the OLT declares the alarm associated with the presence of a rogue ONU in response to the anomaly count exceeding the anomaly count threshold.

8. The OLT of claim 6, further configured to:
   in response to receiving an anomalous inter-burst gap, determining identifiers associated with the ONU that transmitted the immediately preceding burst of light and the ONU that transmitted the immediately subsequent burst of light; and in response to receiving an anomalous inter-burst gap, logging the identifier associated with an immediately previous burst of light and logging the identifier associated with an immediately subsequent burst of light.

9. A method performed in an optical line terminal (OLT) in a passive optical network (PON) for detecting a rogue optical network unit (ONU) operating among a plurality of ONUs in the PON, the method comprising the steps of:
   receiving a plurality of bursts of light from the plurality of ONUs, each of the plurality of bursts of light separated from the other bursts of light by an inter-burst gap containing a minimum dark interval during which the OLT expects to receive no optical power;
   receiving optical power during one or more of the minimum dark intervals;
   determining whether one or more of the inter-burst gaps was anomalous based on, at least, the optical power received during one or more of the minimum dark intervals; and
   in response to determining that one or more of the inter-burst gaps was anomalous, automatically initiating diagnostics to identify the rogue ONU amongst the plurality of ONUs.

10. The method of claim 9, further comprising the steps of:
    counting the number of dark intervals during an observation period including the one or more minimum dark intervals; and
    determining further whether one or more inter-burst gaps was anomalous on the basis of the observed number of dark intervals during the observation period, compared with the number of expected dark intervals.

11. The method of claim 9, further comprising the steps of:
    measuring the optical power that was received during one or more minimum dark intervals;
    determining that the received optical power exceeded a non-zero optical power threshold during one or more of the minimum dark intervals; and
    in response to determining that the received optical power exceeded a non-zero optical power threshold during one or more of the minimum dark intervals, determining that those inter-burst gaps were anomalous.

12. The method of claim 9, further comprising the steps of:
    in response to determining that one or more of the inter-burst gaps was anomalous, incrementing an anomaly count that indicates the rogue ONU has been detected when an anomaly count threshold is exceeded; and
    wherein the automatic initiation of diagnostics to indentify a rogue ONU amongst the plurality of ONUs is in response to the anomaly count exceeding the anomaly count threshold.

13. The method of claim 9, further comprising the steps of:
    in response to receiving an anomalous inter-burst gap, determining identifiers associated with the ONU that transmitted the immediately preceding burst of light and the ONU that transmitted the immediately subsequent burst of light; and
    in response to receiving an anomalous inter-burst gap, logging the identifier associated with an immediately previous burst of light and logging the identifier associated with an immediately subsequent burst of light.

\* \* \* \* \*

UNITED STATES PATENT AND TRADEMARK OFFICE
CERTIFICATE OF CORRECTION

| | | |
|---|---|---|
| PATENT NO. | : 8,842,990 B2 | Page 1 of 1 |
| APPLICATION NO. | : 12/981365 | |
| DATED | : September 23, 2014 | |
| INVENTOR(S) | : Hood | |

It is certified that error appears in the above-identified patent and that said Letters Patent is hereby corrected as shown below:

In the Specification

In Column 5, Line 67, delete "230E-G," and insert -- 230F-G, --, therefor.

In Column 6, Line 2, delete "230E-G" and insert -- 230F-G --, therefor.

In Column 6, Line 7, delete "230E-G." and insert -- 230F-G. --, therefor.

Signed and Sealed this
Twenty-eighth Day of April, 2015

Michelle K. Lee
*Director of the United States Patent and Trademark Office*